(12) United States Patent
Irwin

(10) Patent No.: US 6,729,633 B1
(45) Date of Patent: May 4, 2004

(54) STEERING KNUCKLE CENTERING ADJUSTER

(75) Inventor: Earl James Irwin, Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 66 days.

(21) Appl. No.: 09/893,593

(22) Filed: Jun. 29, 2001

(51) Int. Cl.⁷ .............................................. B62D 17/00
(52) U.S. Cl. .............................. 280/86.75; 280/86.751; 280/93.512
(58) Field of Search ....................... 280/93.512, 86.756, 280/86.754, 86.751, 86.75

(56) References Cited

U.S. PATENT DOCUMENTS

| | | | |
|---|---|---|---|
| 4,195,862 A | | 4/1980 | Specktor et al. |
| 4,232,880 A | * | 11/1980 | Dickerson et al. ...... 280/86.756 |
| 4,252,338 A | | 2/1981 | Ingalls et al. |
| 4,509,772 A | * | 4/1985 | Drotar et al. ........... 280/86.756 |
| 4,836,574 A | | 6/1989 | Ingalls |
| 4,921,271 A | * | 5/1990 | Berry et al. ............ 280/86.756 |
| 4,953,889 A | * | 9/1990 | Reilly ........................ 180/254 |
| 5,316,332 A | * | 5/1994 | Ingalls ................... 280/86.754 |
| 5,538,273 A | * | 7/1996 | Osenbaugh et al. ... 280/86.756 |
| 5,697,632 A | | 12/1997 | Burman et al. |
| 5,749,594 A | * | 5/1998 | Krisher ..................... 280/124.1 |
| 6,302,416 B1 | * | 10/2001 | Schmack ................. 280/86.75 |
| 6,371,500 B1 | * | 4/2002 | Goddard ................ 280/86.754 |
| 6,588,776 B1 | * | 7/2003 | Irwin .................... 280/86.751 |

* cited by examiner

Primary Examiner—Paul N. Dickson
Assistant Examiner—Deanna Draper
(74) Attorney, Agent, or Firm—Liniak, Berenato & White

(57) ABSTRACT

A wheel end assembly in a steering beam axle for use in a motor vehicle. The wheel end assembly comprises a tube yoke attached to an axle tube defining an axle centerline, a steering knuckle defining a steering knuckle centerline, a driving axle shaft rotatably disposed in the axle tube, a live spindle rotatably supported by the steering knuckle, a stub shaft extending through the live spindle and rotatably coupled thereto, and a universal joint connecting the driving axle shaft and the stub shaft. The steering knuckle is pivotally coupled to the tube yoke through a pair of vertically spaced swivel joints defining a steering axis. The wheel end assembly further includes a knuckle centering adjuster for adjusting the knuckle centerline by selectively moving said steering knuckle relative to said tube yoke along said steering axis in order to align the knuckle centerline to the axle centerline.

13 Claims, 5 Drawing Sheets

STEERING KNUCKLE CENTERING ADJUSTER

BACKGROUND OF THE INVENTION

1. Field of the Invention

The present invention relates to wheel end assemblies for motor vehicles, and more particularly to an arrangement for aligning a centerline of a steering knuckle in a live spindle wheel end assembly in a steering beam axle assembly for use in a motor vehicle.

2. Description of the Prior Art

Motor vehicle wheel end assemblies may be divided into two general categories—dead spindles and live spindles. The dead spindle wheel end assemblies generally include a non-rotatable spindle extending outward from a mounting member, such as a steering knuckle, which is typically attached to a vehicle chassis. A wheel hub including a wheel-mounting flange is supported for rotation on the spindle by bearings. A wheel and tire assembly may then be attached to the wheel-mounting flange so that the wheel is mounted coaxially with the spindle and wheel hub.

Wheel end assemblies including a dead spindle can be used on a part time four wheel drive vehicle that is free running when the driver has selected two-wheel drive mode. The wheel end assembly receives torque from a drive axle when the driver has selected four-wheel drive mode, wherein a bore is formed through the spindle to accept a drive axle that originates at a differential. The drive axle is coupled to rotate with a first gear or member of a hub lock mechanism and the wheel hub is coupled to rotate with a second gear or member of the hub lock mechanism. The hub lock mechanism is designed to selectively couple the drive axle to the wheel hub by engaging the first hub lock member with the second hub lock member thereby allowing the drive axle to transmit torque to the wheel hub and ultimately to the vehicle wheel/tire assembly mounted thereon. For a driving/steering axle, a constant velocity universal joint is also provided between the differential and the wheel end assembly.

The live spindle wheel end assemblies generally include a spindle, which is supported for rotation by bearings within a bore formed in a mounting member such as a steering knuckle, which is attached to a vehicle chassis. A wheel mounting flange is formed in the spindle or is attached thereto by welding or another suitable method. To provide the live spindle wheel end assembly for use on a four wheel drive vehicle that is free running when the driver has selected two-wheel drive mode and that receives torque from a drive axle when the driver has selected four-wheel drive mode, a bore is formed through the spindle to accept a drive axle that originates at a differential. The drive axle is coupled to rotate with a first gear or member of a hub lock mechanism and the spindle is coupled to rotate with a second gear or member of the hub lock mechanism. The hub lock mechanism is designed to selectively couple the drive axle to the spindle by engaging the first hub lock member with the second hub lock member thereby allowing the drive axle to transmit torque to the spindle, and ultimately to the vehicle wheel/tire assembly. For a driving/steering axle, a universal joint, such as constant velocity joint, must also be provided between the differential and the wheel end assembly.

In general, the live spindle wheel end assemblies are supported for rotation within the bore of the mounting member by bearing assemblies including an inner race, an outer race, and a plurality of rolling elements circumferentially spaced between the inner and outer races. These bearing assemblies are typically slid onto the outer surface of the spindle and held in place by a lock-nut or another suitable retainer. However, it has been found that the inner bearing race may be formed directly in the outer surface of the spindle, thereby eliminating the need to provide a bearing assembly including a separate inner bearing race. Such a bearing assembly provides numerous advantages such as ease of assembly and disassembly, ease of service, less unsprung vehicle weight, and potentially lower cost. However, the use of these wheel end assemblies having the inner bearing races formed directly on the spindle has been limited to two-wheel drive applications. With the increasing popularity of four-wheel drive vehicles, there has been found a need to provide such a wheel end assembly that is capable of receiving a hub lock mechanism to selectively drivingly couple a drive axle to the spindle so that torque may be transmitted from the drive axle through the spindle and to a road wheel mounted thereon.

As well known to those skilled in the art, in order for the live spindle wheel end assembly to operate properly (i.e., without excessive load, friction and vibration), a centerline of the steering knuckle, coinciding with an axis of rotation of the spindle, has to be aligned with an axis of rotation of the drive axle shaft. Steering knuckle centerline misalignment adversely affects spindle bearings and universal joint durability and performance, and generates unwanted vibration and noise. However, existing designs of the live spindle wheel end assemblies do not allow for adjustment (aligning) of the steering knuckle centerline and the drive axle shaft axis of rotation. Currently, alignment of the steering knuckle centerline and the drive axle shaft axis is defined solely by the tolerance stack-up of the components of the wheel end assembly.

Thus, there is a need for a live spindle wheel end assembly that includes a steering knuckle centering adjuster for aligning a centerline of a steering knuckle.

SUMMARY OF THE INVENTION

The present invention provides a novel arrangement of a wheel end assembly in a steering beam axle for use in a motor vehicle. The wheel end assembly in accordance with the present invention comprises a tube yoke attached to an axle tube defining an axle centerline, a steering knuckle defining a steering knuckle centerline, a driving axle shaft rotatably disposed in the axle tube, a live spindle rotatably supported by the steering knuckle, a stub shaft extending through the live spindle and rotatably coupled thereto, and a universal joint connecting the driving axle shaft and the stub shaft. The steering knuckle is pivotally coupled to the tube yoke through at least one swivel joint assembly defining a steering axis.

Preferably, the tube yoke has vertically spaced upper and lower arms, and the steering knuckle has an upper flange disposed adjacent the upper arm of the tube yoke and a lower flange disposed adjacent the lower arm of the tube yoke. The upper arm of the tube yoke is pivotally connected to the upper flange of the steering knuckle through an upper swivel joint assembly, while the lower arm of the tube yoke is pivotally connected to the lower flange of the steering knuckle through a lower swivel joint assembly.

The wheel end assembly further includes a knuckle centering adjuster for adjusting the knuckle centerline by selectively moving said steering knuckle relative to said tube yoke along said steering axis in order to align the knuckle centerline to the axle centerline. Preferably, the steering knuckle centering adjuster includes an adjusting sleeve threadedly positioned in a bore in the lower flange of the steering knuckle, wherein the adjusting sleeve positively engages a stud extending from the lower swivel joint assembly, and wherein rotation of the adjusting sleeve within the bore in the lower flange of the steering knuckle causes the steering knuckle to move relative to the lower swivel joint assembly along the steering axis thereby resulting in an adjustment of the steering knuckle centerline by aligning the steering knuckle centerline to the axle centerline.

Therefore, the wheel end assembly with the steering knuckle centering adjuster in accordance with the present invention represents a novel arrangement of the wheel end assembly that provides less vibration, and improves durability of spindle bearings and universal joints over the current design.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
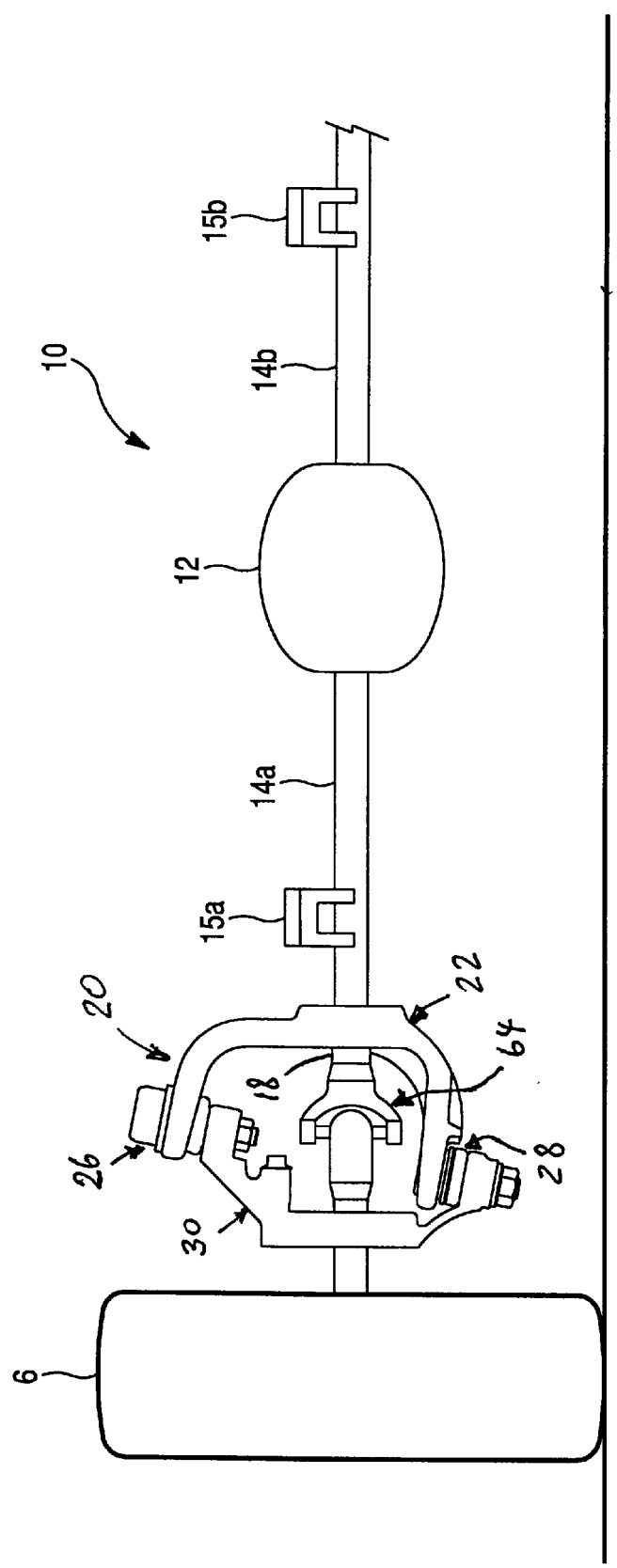
FIG. 1 shows a front steering beam axle of a four-wheel drive motor vehicle.

Referring first to FIG. 1, the reference numeral 10 is employed to designate a front steering axle assembly for driving front wheels of a conventional front wheel drive (FWD) or four wheel drive (4WD) automotive vehicle (not shown). The front axle assembly 10 comprises a conventional differential located in a central portion of an axle housing 12, which includes opposite axle tubes 14a and 14b. These axle tubes 14a and 14b support through suitable spring means 15a and 15b a front portion of the automotive vehicle. It is understood that springs 15a and 15b are connected to a vehicle frame or body (not shown) in a conventional manner well known to those skilled in the art. Each of the axle tubes 14a and 14b is hollow and supports an axle shaft 18, which is driven through the differential housed in the axle housing 12.

Figure 2:
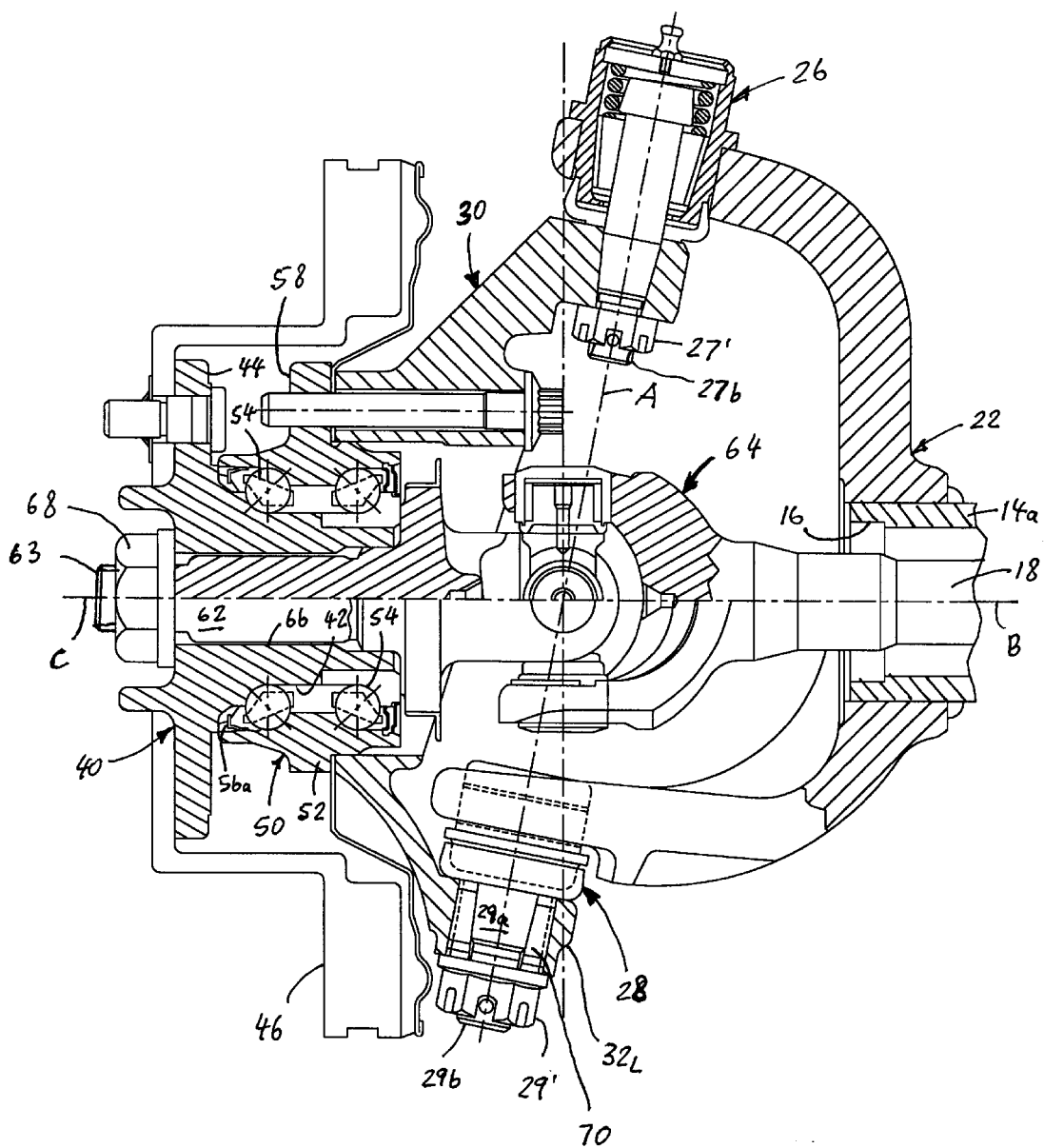
FIG. 2 is a partial sectional view of a wheel end assembly of the steering beam axle of the present invention.

Refering now to FIG. 2, the reference numeral 20 is employed to designate a live spindle wheel end assembly utilized in the steering axle assembly 10 of a part time four-wheel drive vehicle. The wheel end assembly 20 comprises a tube yoke 22 pivotally coupled to a steering knuckle 30 using upper and lower swivel joint assemblies 26 and 28 respectively, such that the steering knuckle 30 may pivot about a steering axis A in response to steering forces originated by a vehicle operator. The tube yoke 22 receives the axle tubes 14a through a bore 23, and is welded or otherwise fixedly secured to an outboard end of the axle tube 14a provided with a stepped bore 16 that defines an axle centerline B coinciding with an axis of rotation of the axle shaft 18.

Figure 5:
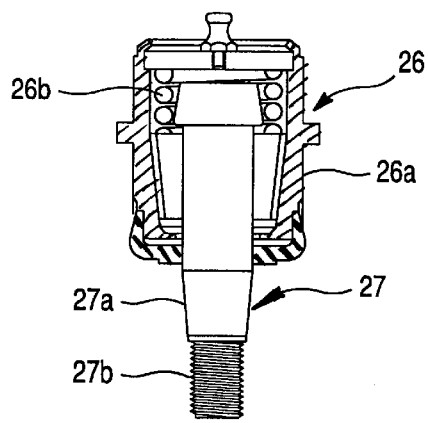
FIG. 5 is a partial sectional view of an upper swivel joint assembly.

The upper swivel joint assembly 26, such as spring-loaded socket assembly, part # J/73/BJZ/2/A/111, manufactured by TRW Inc. of Lyndhurst, Ohio, is provided with a tapered and threaded stud 27 extending therefrom. As illustrated in FIG. 5, the stud 27 of the swivel joint assembly 26 has a tapered portion 27a and a threaded portion 27b. More specifically, the stud 27 of the upper swivel joint assembly 26 is biased by a coil spring 26b disposed inside a housing 26a of the swivel joint assembly 26, as shown in FIG. 5. This arrangement allows for a certain movement of the stud 27 within the housing 26a of the swivel joint assembly 26. It will be appreciated that other appropriate spring means for biasing the stud 27, besides the coil spring, are within the scope of the present invention.

Figure 6:
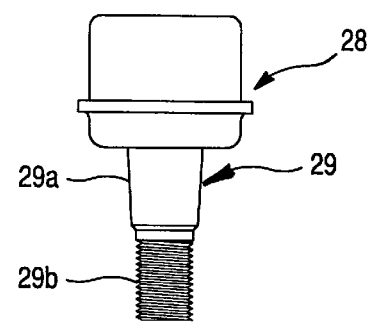
FIG. 6 shows a lower swivel joint assembly.

The lower swivel joint assembly 28, such as regular ball joint well known in the art, is provided with a tapered and threaded stud 29 extending therefrom. As shown in FIG. 6, the stud 29 of the swivel joint assembly 28 has a tapered portion 29a and a threaded portion 29b.

Figure 3:
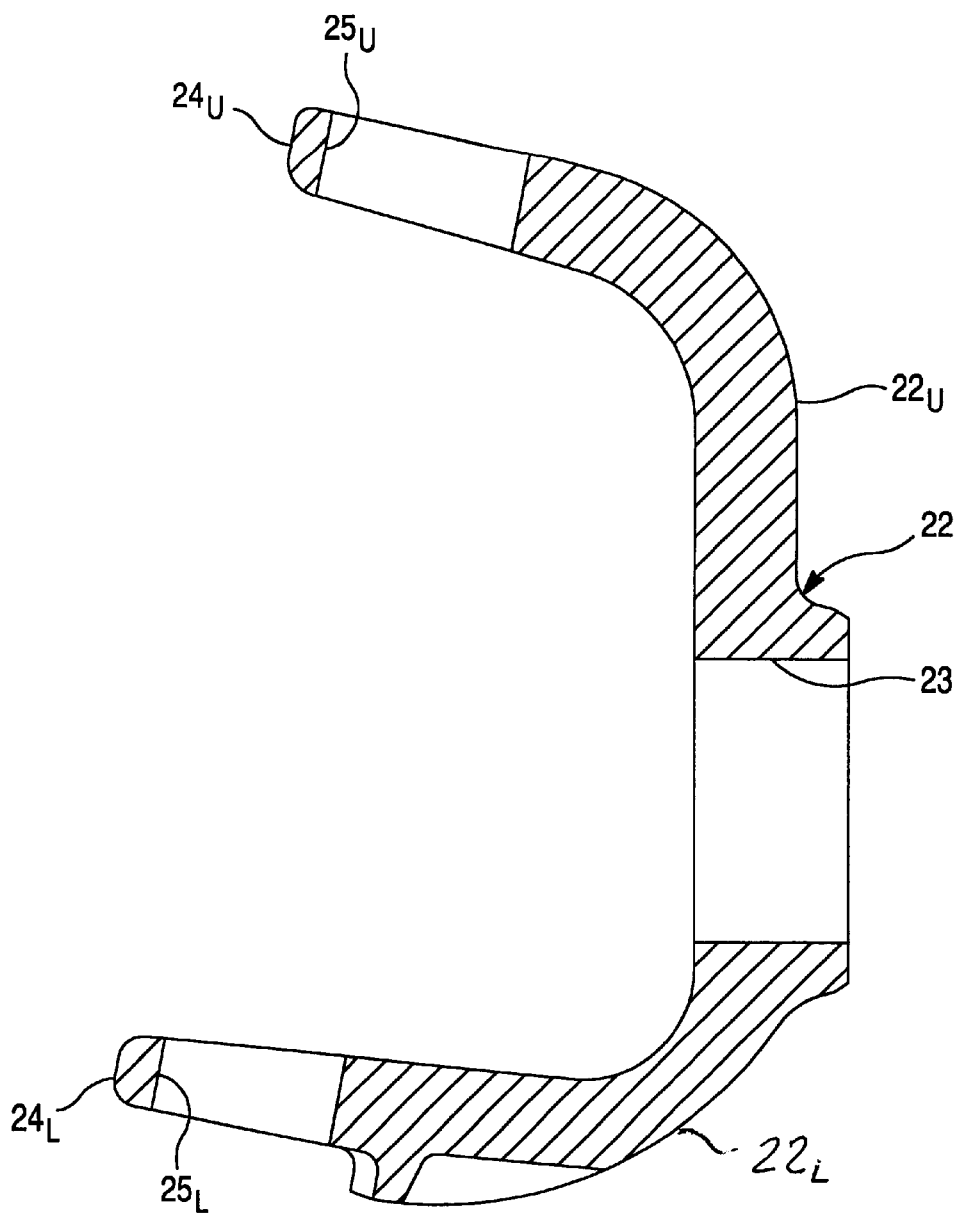
FIG. 3 is a cross-sectional view of a tube yoke.

Furthermore, the tube yoke 22, as illustrated in details in FIG. 3, includes an upper yoke arm $22_U$ and a lower yoke arm $22_L$ originated at opposite sides of the bore 23 and traveling outward therefrom to provide a distal end $24_L$ of lower yoke arm $22_L$ and a distal end $24_U$ of upper yoke arm $22_U$ in a spaced apart relationship. The distal end $24_U$ of upper yoke arm $22_U$ includes a bore $25_U$ formed therethrough such that the upper swivel joint assembly 26 may be received therein as is well known in the art. Similarly, the distal end $24_L$ of lower yoke arm $22_L$ includes a bore $25_L$ formed therethrough such that a lower swivel joint 28 assembly may be received therein as is known in the art.

Figure 4:
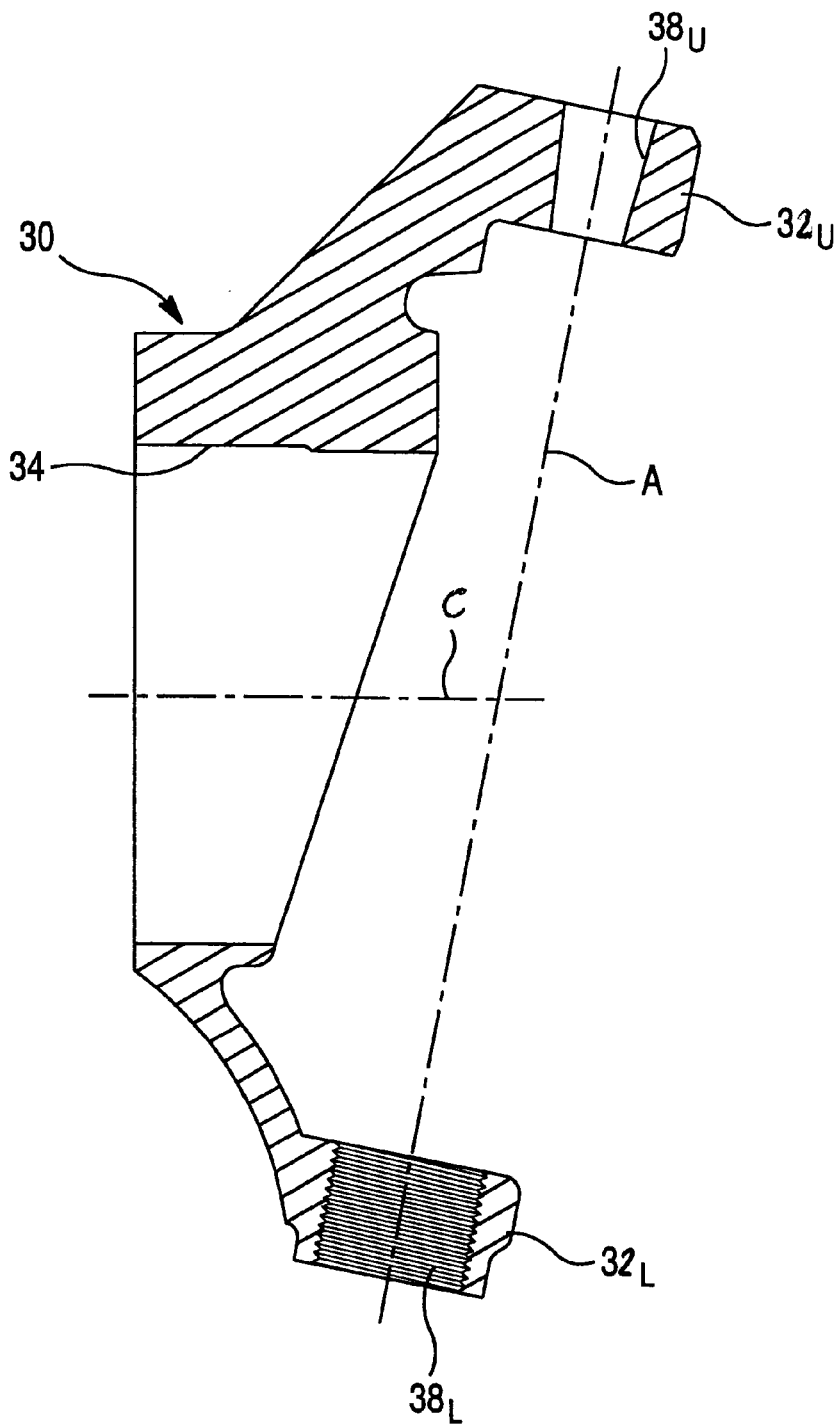
FIG. 4 is a cross-sectional view of a steering knuckle of the present invention.

The steering knuckle 30, as illustrated in details in FIG. 4, includes an upper knuckle flange $32_U$ and a lower knuckle flange $32_L$ originated at opposite sides of a knuckle pilot bore 34 defining a steering knuckle centerline C, and spaced apart from one another. The upper knuckle flange $32_U$ is disposed adjacent the distal end $24_U$ of upper yoke arm $22_U$, and the lower knuckle flange $32_L$ is disposed adjacent the distal end $24_L$ of lower yoke arm $22_L$.

The upper knuckle flange $32_U$ includes a tapered bore $38_U$ formed therethrough. The tapered bore $38_U$ is complementary to the tapered portion 27a of the stud 27 such that the stud 27 of the upper swivel joint assembly 26 may be received therein as is well known in the art. The upper knuckle flange $32_U$ of the steering knuckle 30 is secured to the swivel joint assembly 26 as is known in the art using a nut 27' or any other suitable fastener, threadedly engaging the threaded portion 27b of the stud 27.

The lower knuckle flange $32_L$ includes a generally cylindrical threaded bore $38_L$ formed therethrough such that the stud 29 of the lower swivel joint assembly 28 may be received therein. The lower knuckle flange $32_L$ of the steering knuckle 30 is secured to the swivel joint assembly 28 as is known in the art using a nut 29' or any other suitable fastener, threadedly engaging the threaded portion 29b of the stud 29.

As illustrated in FIG. 2, the wheel end assembly 20 of the present invention further comprises a live spindle 40 supported for rotation about the knuckle centerline C by a bearing assembly 50 fixed to the steering knuckle 30 within the knuckle pilot bore 34 formed therethrough. In the four-wheel drive (or front-wheel drive) mode, the axle shaft 18, rotatably supported within the axle tube 14a for rotation about the axle centerline B, is provided to deliver torque to the spindle 40 as is described in more detail below. The spindle 40 includes an outer surface 42 and a wheel-mounting flange 44. A vehicle wheel with a pneumatic tire 6 (shown in FIG. 1) is drivingly mounted to the wheel-mounting flange 44 utilizing a plurality of wheel mounting studs 45 (only one of which is shown in FIG. 2) which are spaced circumferentially around the wheel-mounting flange 44 of the spindle 40 and extend therethrough. A brake rotor 46 is also mounted to flange 44 by the mounting studs 45 to rotate therewith.

The bearing assembly 50 includes a stationary outer bearing race shell 52, a rotatable inner bearing race formed on the outer surface 42 of the spindle 40, and two row of rolling elements 54, wherein the rolling elements 54 are provided as ball bearings or other suitable bearings well known in the art, such as tapered roller bearings. An inner seal 56a and an outer seal 56b are provided to inhibit the entry of dirt, water, or other contaminants into the bearing assembly 50.

The outer bearing race shell 52 of the bearing assembly 50 further includes a mounting flange 58 for securing thereof to the steering knuckle 30 by means of conventional fasteners, such a set of bolts 60 (only one of which is shown in FIG. 2), which are spaced circumferentially around the mounting flange 58, thereby rotatably coupling the steering knuckle 30 to the spindle 40.

The live spindle 40 is driven by a stub shaft 62 extending through a central bore 41 formed through the spindle 40 coaxially to the knuckle centerline C. The stub shaft 62 is drivingly connected to the axle shaft 18 by a universal joint well known in the art, such as a conventional Cardan joint 64. It will be appreciated that any other type of universal joint, such as constant velocity joint, is within the scope of the present invention. Furthermore, the stub shaft 62 is drivingly coupled to the spindle 40 through a suitable splined connection 66 in a manner that is well known to those skilled in the art. The spindle 40 is retained on the stub shaft 62 by a nut 68, which engages a threaded outboard end 63 of the stub shaft 62.

As well known to those skilled in the art, in order for the live spindle wheel end assembly 20 to operate properly (i.e., without excessive load, friction and vibration), the knuckle centerline C of the steering knuckle 30, coinciding with the axis of rotation of the stub shaft 62, has to be aligned with the axle centerline B, coinciding with the axis of rotation of the axle shaft 18.

In accordance with the preferred exemplary embodiment of the present invention, the wheel end assembly 20 further includes a knuckle centering adjuster interposed between the distal end $24_U$ of upper yoke arm $22_U$ of the tube yoke 22 and lower knuckle flange $32_L$ of the steering knuckle 30 for adjusting a relative position of the steering knuckle 30 with respect to the tube yoke 22 by selectively moving the steering knuckle 30 relative to the tube yoke 22 along the steering axis A in order to align the knuckle centerline C to the axle centerline B.

Figure 7:
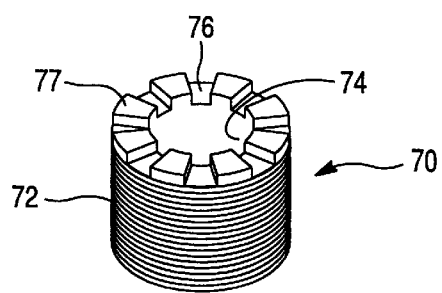
FIG. 7 is a perspective view of an adjusting sleeve in accordance with the present invention.
Figure 8:
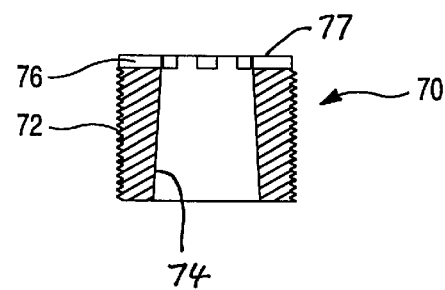
FIG. 8 is a sectional view of the adjusting sleeve in accordance with the present invention.

More particularly, the knuckle centering adjuster comprises an adjusting sleeve 70 illustrated in details in FIGS. 7 and 8. The adjusting sleeve 70 in accordance with the preferred embodiment of the present invention has a generally cylindrical threaded outer peripheral surface 72, and a substantially conical inner bore 74 complementary to the tapered portion 29a of the stud 29 of the swivel joint 28. Rectangular grooves 76 are formed in an end surface 77 of the adjusting sleeve 70 to facilitate installation using a complementary adjusting wrench (not shown). As shown in FIG. 2, the adjusting sleeve 70 is threaded into the threaded bore $38_L$ of the lower knuckle flange $32_L$. The tapered portion 29a of the stud 29 is received in the complementary inner bore 74 of the adjusting sleeve 70. The nut 29' fixes the lower swivel joint 28 in place.

It will be readily understood from the above description that by rotating the adjusting sleeve 70 by the adjusting wrench relative to the bore $38_L$ of the lower knuckle flange $32_L$, the steering knuckle 30 is caused to move relative to the tube yoke 22 along the steering axis A resulting in an alignment of the knuckle centerline C to the axle centerline B.

In operation, during assembling of the wheel end of the front steering axle assembly 10, the steering knuckle 30 is mounted to the tube yoke 22 through the upper swivel joint 26 and the lower swivel joint 28, and the nut 27' of the upper swivel joint 26 is torqued to specification. Next, a measurement is taken of the alignment relationship of the steering knuckle to the axle. In the preferred exemplary embodiment of the present invention, any appropriate centering device well known in the art, may be used between the knuckle pilot bore 34 and the stepped bore 16 in the axle tube 14a. The adjusting sleeve 70 is then rotated up or down in the threaded bore $38_L$ of the lower knuckle flange $32_L$, thus moving the steering knuckle 30 relative to the tube yoke 22 along the steering axis A, align until the knuckle centerline C aligns to the axle centerline B.

As is shown in FIG. 2 and described hereinabove, the knuckle centering adjuster is interposed between the distal end $24_U$ of upper yoke arm $22_U$ of the tube yoke 22 and lower knuckle flange $32_L$ of the steering knuckle 30. While as shown, the adjusting sleeve 70 of the present invention is mounted into the lower knuckle flange $32_L$ of the steering knuckle 30 as is thought preferable, those skilled in the art will recognize that the present invention 70 may likewise be incorporated into the upper knuckle flange $32_U$. Also, it is contemplated herein that the adjusting sleeve 70 could be incorporated into both the upper and lower knuckle flanges $32_U$ and $32_L$ to allow a greater degree of adjustment to be attained.

Therefore, the wheel end assembly with the steering knuckle centering adjuster in accordance with the present invention represents a novel arrangement of the wheel end assembly that provides less vibration, and improves endurance of spindle bearings and universal joints over the current design.

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A wheel end assembly in a motor vehicle, said assembly comprising:
    a tube yoke attached to a distal end of an axle tube, said axle tube defining an axle centerline;
    a steering knuckle defining a steering knuckle centerline;
    said steering knuckle is pivotally connected to said tube yoke through at least one swivel joint assembly defining a steering axis; and
    a knuckle centering adjuster interposed between said tube yoke and said knuckle for adjusting a relative position of said steering knuckle with respect to said tube yoke by selectively moving said steering knuckle relative to said tube yoke along said steering axis in order to align said knuckle centerline to said axle centerline.

2. The wheel end assembly as defined in claim 1, further comprising:
    a driving axle shaft rotatably disposed in said axle tube of said vehicle;
    a live spindle rotatably supported by said steering knuckle;
    a stub shaft extending through said live spindle and rotatably coupled thereto;
    a universal joint connecting said driving axle shaft and said stub shaft.

3. The wheel end assembly as defined in claim 2, wherein said universal joint is a Cardan joint.

4. The wheel end assembly as defined in claim 2, wherein said universal joint is a constant velocity joint.

5. The wheel end assembly as defined in claim 1, wherein said tube yoke has vertically spaced upper and lower arms each having a bore formed therethrough;
    wherein said steering knuckle has an upper flange disposed adjacent said upper arm of said tube yoke and a lower flange disposed adjacent said lower arm of said tube yoke;
    wherein each of said upper and lower flanges of said steering knuckle has a bore formed therein;
    wherein said upper arm of said tube yoke is pivotally connected to said upper flange of said steering knuckle through an upper swivel joint assembly; and
    wherein said lower arm of said tube yoke is pivotally connected to said lower flange of said steering knuckle through a lower swivel joint assembly.

6. The wheel end assembly as defined in claim 5, wherein one of said upper swivel joint assembly and said lower swivel joint assembly allows relative movement of said steering knuckle with respect to said tube yoke.

7. The wheel end assembly as defined in claim 5, wherein said knuckle centering adjuster comprises an adjusting sleeve adjustably positioned in one of said bore in said lower flange of said steering knuckle and said bore in said upper flange of said steering knuckle for adjusting a relative position of said steering knuckle with respect to said tube yoke by selectively moving said steering knuckle relative to said tube yoke along said steering axis in order to align said knuckle centerline to said axle centerline.

8. The wheel end assembly as defined in claim 5, wherein said upper swivel joint assembly allows relative movement of said steering knuckle with respect to said tube yoke and said steering knuckle centering adjuster comprises an adjusting sleeve adjustably positioned in said bore in said lower flange of said steering knuckle for adjusting a relative position of said steering knuckle with respect to said tube yoke by selectively moving said steering knuckle relative to said tube yoke along said steering axis in order to align said knuckle centerline to said axle centerline.

9. The wheel end assembly as defined in claim 8, wherein said adjusting sleeve has a substantially cylindrical outer peripheral surface threadedly engaging said bore in said lower flange of said steering knuckle.

10. The wheel end assembly as defined in claim 9, wherein said adjusting sleeve positively engages a stud extending from said lower swivel joint assembly, and wherein rotation of said adjusting sleeve within said bore in said lower flange of said steering knuckle causes said steering knuckle to move relative to said lower swivel joint assembly along said steering axis thereby resulting in an adjustment of said steering knuckle centerline.

11. A wheel end assembly in a steering beam axle assembly for use in a motor vehicle, said assembly comprising:
    a tube yoke attached to a distal end of an axle tube, said axle tube defining an axle centerline, said tube yoke having vertically spaced upper and lower arms each having a bore formed therethrough;
    a driving axle shaft rotatably disposed in said axle tube of said vehicle;
    a steering knuckle pivotally coupled to said tube yoke about a steering axis;
    a live spindle rotatably supported by said steering knuckle;
    a stub shaft extending through said live spindle and rotatably coupled thereto;
    a universal joint connecting said driving axle shaft and said stub shaft;
    said steering knuckle having an upper flange disposed adjacent said upper arm of said tube yoke, a lower flange disposed adjacent said lower arm of said tube yoke and a steering knuckle pilot bore defining a steering knuckle centerline, wherein each of said flanges includes a bore formed therein;
    said upper arm of said tube yoke is pivotally connected to said upper flange of said steering knuckle through an upper swivel joint assembly that allows relative movement of said steering knuckle with respect to said tube yoke;
    said lower arm of said tube yoke is pivotally connected to said lower flange of said steering knuckle through a lower swivel joint assembly; and
    a steering knuckle centering adjuster including an adjusting sleeve threadedly positioned in said bore in said lower flange of said steering knuckle for adjusting a relative position of said steering knuckle with respect to said tube yoke, wherein said adjusting sleeve positively engages a stud extending from said lower swivel joint assembly, and wherein rotation of said adjusting sleeve within said bore in said lower flange of said steering knuckle causes said steering knuckle to move relative to said lower swivel joint assembly along said steering axis thereby resulting in an adjustment of said steering knuckle centerline by aligning said steering knuckle centerline to said axle centerline.

12. The wheel end assembly as defined in claim 11, wherein said universal joint is a Cardan joint.

13. The wheel end assembly as defined in claim 11, wherein said universal joint is a constant velocity joint.

* * * * *